United States Patent
Kagerer et al.

(10) Patent No.: US 11,142,213 B2
(45) Date of Patent: Oct. 12, 2021

(54) LONGITUDINAL CONTROL SYSTEM FOR A MOTOR VEHICLE

(71) Applicant: Bayerische Motoren Werke Aktiengesellschaft, Munich (DE)

(72) Inventors: Walter Kagerer, Munich (DE); Andreas Lechner, Munich (DE); Christoph Hellfritsch, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/162,550

(22) Filed: Oct. 17, 2018

(65) Prior Publication Data

US 2019/0047585 A1 Feb. 14, 2019

Related U.S. Application Data

(63) Continuation of application No. PCT/EP2017/059225, filed on Apr. 19, 2017.

(30) Foreign Application Priority Data

Apr. 22, 2016 (DE) .................. 10 2016 206 852.0

(51) Int. Cl.
*B60W 50/10* (2012.01)
*B60W 30/17* (2020.01)
(Continued)

(52) U.S. Cl.
CPC .......... *B60W 50/10* (2013.01); *B60W 30/143* (2013.01); *B60W 30/17* (2013.01);
(Continued)

(58) Field of Classification Search
CPC .............. B60W 50/10; B60W 30/143; B60W 30/18018; B60W 40/04; B60W 30/17; B60W 2540/04; B60W 2420/24
See application file for complete search history.

(56) References Cited

U.S. PATENT DOCUMENTS

| 6,820,709 B1 | 11/2004 | Zimmermann et al. |
| 2013/0191003 A1 | 7/2013 | Hahne et al. |
| 2019/0283777 A1* | 9/2019 | Mimura ................ B60W 50/14 |

FOREIGN PATENT DOCUMENTS

| DE | 199 58 520 A1 | 6/2001 |
| DE | 10 2011 013 023 A1 | 9/2012 |

(Continued)

OTHER PUBLICATIONS

International Search Report (PCT/ISA/210) issued in PCT Application No. PCT/EP2017/059225 dated Jul. 12, 2017 with English translation (four (4) pages).
(Continued)

*Primary Examiner* — Rodney A Butler
(74) *Attorney, Agent, or Firm* — Crowell & Moring LLP

(57) ABSTRACT

A longitudinal control system is provided for a motor vehicle equipped with a sensor system for detecting a traffic event lying ahead, in particular in order to locate vehicles traveling ahead, and a control unit for automatically controlling the speed or the acceleration of the motor vehicle to a standstill on the basis of the traffic event lying ahead. An automatic drive-off is allowed without a driver confirmation within a specified time interval after reaching the standstill, and after the time interval has expired, an automatic start-up is allowed after a start-up confirmation is triggered by the driver. A start-up confirmation is triggered if a contacted state of the steering wheel is detected starting from a non-contacted state of the steering wheel.

13 Claims, 2 Drawing Sheets

(51) Int. Cl.
*B60W 30/18* (2012.01)
*B60W 40/04* (2006.01)
*B60W 30/14* (2006.01)

(52) U.S. Cl.
CPC ...... *B60W 30/18018* (2013.01); *B60W 40/04* (2013.01); *B60W 2420/24* (2013.01); *B60W 2540/215* (2020.02)

(56) References Cited

FOREIGN PATENT DOCUMENTS

| | | |
|---|---|---|
| DE | 10 2011 121 442 A1 | 6/2013 |
| DE | 10 2014 201 282 A1 | 7/2015 |
| DE | 10 2014 201 544 A1 | 7/2015 |
| DE | 10 2015 101 563 A1 | 8/2015 |
| EP | 2 930 081 A1 | 10/2015 |
| JP | 2009208559 A * | 9/2009 |

OTHER PUBLICATIONS

German-language Written Opinion (PCT/ISA/237) issued in PCT Application No. PCT/EP2017/059225 dated Jul. 12, 2017 (six (6) pages).
German-language Search Report issued in counterpart German Application No. 102016206852.0 dated Jan. 25, 2017 with partial English translation (12 pages).

* cited by examiner

LONGITUDINAL CONTROL SYSTEM FOR A MOTOR VEHICLE

CROSS REFERENCE TO RELATED APPLICATIONS

This application is a continuation of PCT International Application No. PCT/EP2017/059225, filed Apr. 19, 2017, which claims priority under 35 U.S.C. § 119 from German Patent Application No. 10 2016 206 852.0, filed Apr. 22, 2016, the entire disclosures of which are herein expressly incorporated by reference.

BACKGROUND AND SUMMARY OF THE INVENTION

The invention relates to a longitudinal control system for a motor vehicle having a sensor system for detecting the traffic event lying ahead, in particular in order to determine the location of vehicles traveling ahead, and having a control unit for automatically controlling the speed or the acceleration of the motor vehicle to a standstill state and out of the standstill state on the basis of the traffic event lying ahead.

Motor vehicles with longitudinal control systems or speed control systems have been known for a long time. Most of the currently available speed control systems adjust the speed of the motor vehicle to a predefined desired or target speed.

In addition to these longitudinal control systems, longitudinal control systems expanded with a distance control system, referred to as adaptive longitudinal control systems or adaptive speed control systems are also already commercially available nowadays from a number of manufacturers. Systems of this kind which are offered, for example by the Applicant of the present application, under the designation "active cruise control" systems permit the motor vehicle to be driven automatically at a desired or a correspondingly relatively low speed while maintaining a desired distance from a vehicle traveling ahead. In this context, the generally known longitudinal control or speed control system, which maintains a specific predefined speed, is in principle expanded with an additional distance-maintaining function, with the result that the use of such an "active" speed control system becomes possible even in dense freeway traffic and highway traffic. This so-called "active speed control" maintains the predefined desired speed or target speed if the vehicle's own lane is free. If a distance sensor system which is mounted on the motor vehicle and which can operate, in particular, on a radar basis and/or camera basis detects a target object traveling ahead or a (motor) vehicle in its own lane, the vehicle's own speed is adapted—for example by bringing about a suitable braking torque—to the speed of the motor vehicle traveling ahead or of the target object in such a way a distance control system which is contained in the "active speed control system" or in the corresponding longitudinal control system automatically maintains a situation-appropriate distance from the motor vehicle or target object traveling ahead. Such distance-controlled longitudinal control systems are as a rule active or able to be activated only up to a minimum speed of, for example, 30 km/h, but can be expanded with a so-called stop-and-go function, with the result that distance-related speed control as far as and out of the standstill state is possible.

DE 199 58 520 A1 has already disclosed a speed control system which permits, in the so-called stop-&-go mode, control of the speed or of the acceleration as far as the standstill state and out of the standstill state. After the standstill state has been reached in the controlled mode, automatic driving off up to a specific, predefined time limit after the starting off is possible. After this, automatic driving off is possible only after being enabled by the driver.

Basically, for reasons of reliability of use, the time window in which automatic driving off is permitted without being enabled by the driver is limited in order to avoid the driver being surprised by the automatic driving off. In particular, in traffic situations with frequent stop-and-go traffic, the driver must under certain circumstances frequently intervene, as a result of which the driving comfort decreases.

DE 10 2014 201 544 A1 discloses a longitudinal control system as specified above with automatic driving off within a defined time interval, wherein the time interval is predefined on the basis of an estimated attentiveness of the driver. If it is detected that the driver is attentive, for example because the driver has his hands on the steering wheel, a longer time interval is predefined than in the case of a so-called hands-off detection.

The object of the invention is to provide an improved longitudinal control system which permits automatic driving off of the vehicle with confirmation by the driver while taking into account the ensuring of the driver's attentiveness.

This and other objects are achieved according to the invention by a longitudinal control system for a motor vehicle having a sensor system for detecting the traffic event lying ahead, in particular in order to determine the location of vehicles traveling ahead, and having a control unit for automatically controlling the speed or the acceleration of the motor vehicle on the basis of the traffic event lying ahead. The system permits here automatic control of the speed or the acceleration of the motor vehicle in a corresponding traffic situation (e.g. a vehicle which is traveling ahead or a stationary vehicle which is located ahead or corresponding traffic light circuit) up to the standstill state and from the standstill state, wherein automatic driving off is permitted without a driver confirmation within a predefined time interval from the time when the standstill state has been reached.

After this, automatic driving off is permitted only after a driver confirmation or starting confirmation has taken place.

The invention is based on the concept of providing a simple and reliable way of permitting an automatic drive-off by which the driver outputs a starting confirmation and therefore to permit automatic starting after the specified time interval within which automatic starting or confirmation of starting is permitted, has expired. According to the invention, there is provision for this purpose that a starting confirmation is triggered if a contacted state of the steering wheel is detected starting from a non-contacted state, that is to say starting from a situation in which the driver is not touching the steering wheel or is not touching it in a defined way.

In one advantageous refinement of the invention, the abovementioned starting confirmation is triggered if a contacted state of the steering wheel is detected in a defined activation mode starting from a non-contacted state of the steering wheel. Such an activation mode can be a defined activation position on the steering wheel and/or a defined activation sequence.

Therefore, in one particularly advantageous refinement of the invention, starting from a non-contacted state of the steering wheel, a contacted state is detected if the driver touches the steering wheel or grasps the steering wheel rim with at least one hand, in particular with both hands.

Likewise, starting from a non-contacted state of the steering wheel, a contacted state of the steering wheel is also detected (only) if the driver touches the steering wheel at a defined region or grasps the steering wheel rim with at least one hand, in particular with both hands.

Alternatively or additionally there can be provision that, starting from a non-contacted state of the steering wheel, a contacted state is detected when the driver applies a predefined contact pressure, that is to say touches the steering wheel with a minimum force, when touching the steering wheel with one hand, in particular with both hands (at a defined position).

Likewise there can be provision that, starting from a non-contacted state of the steering wheel, a contacted state is detected when the driver performs a predefined contact sequence at the steering wheel, in particular a predefined contact sequence (chronology sequence) in combination with predefined contact positions, with at least one hand, in particular with both hands. This can be, for example, stroking, in particular directional stroking over a predefined segment of the steering wheel rim. Likewise, a changeover from the non-contacted state into the contacted state can be detected after the execution of chronologically successive gripping of the steering wheel rim at different positions of the steering wheel (e.g. firstly on the left, then on the right, then on the left again). However, it is particularly advantageous that, starting from a non-contacted state, a contacted state is detected if the driver touches or taps the steering wheel twice (at a defined position), i.e. if the driver lets the steering wheel go again, within a time interval which starts when the steering wheel is first touched, and then touches it again at least one more time.

The contacted state which triggers a starting confirmation for automatically starting the vehicle from the standstill state, can be detected with a sensor system which is arranged in the steering wheel. For this purpose, for example known so-called hands-on detection system or hands-off detection systems can be used, which systems usually use a sensor system which can measure the capacitance. Additionally or alternatively, the contacted state can also be detected with a camera system which captures at least the region of the steering wheel. For this purpose, for example known passenger compartment-monitoring systems or driver-state-monitoring systems can be used.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
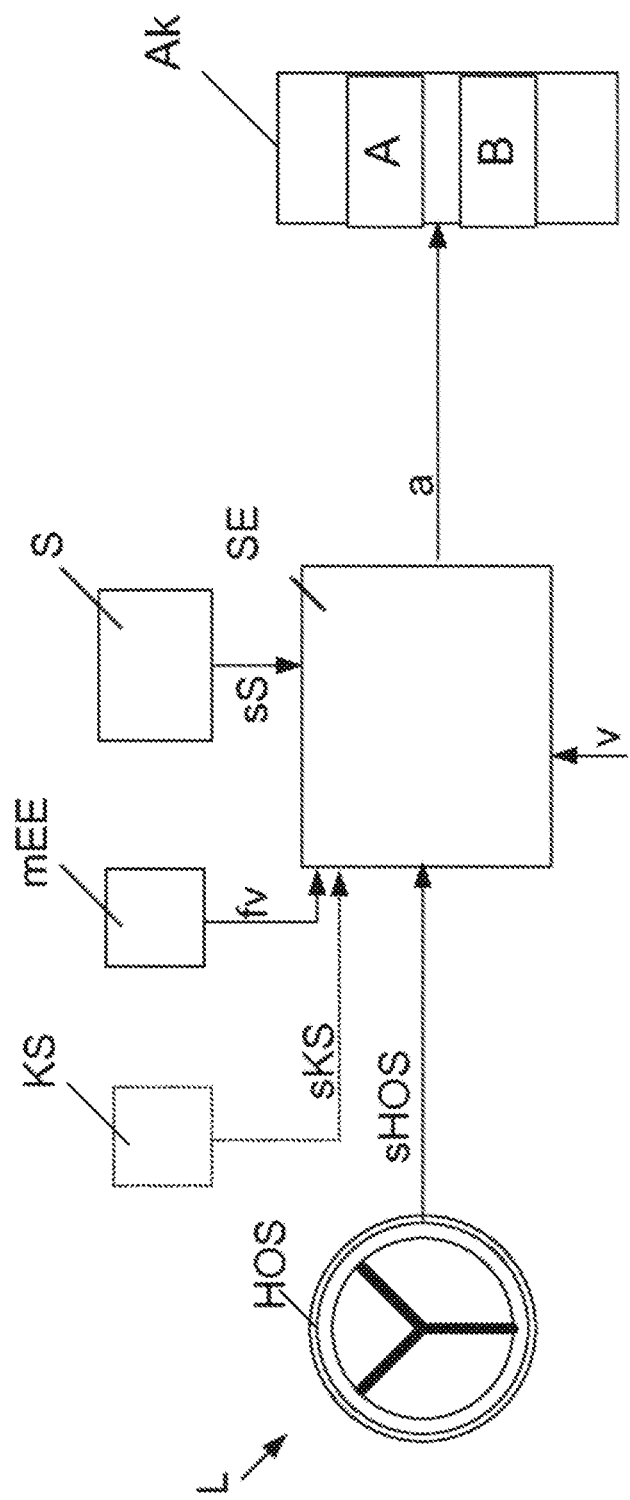
FIG. 1 is a simplified design of a longitudinal control system which serves as an example of the invention.

FIG. 1 shows, as a central element of the longitudinal control and speed control system, a control unit SE which receives various input signals sHOS, sKS, fv, sS and v and generates an output signal and a.

Basically, the control unit SE is configured in such a way that, on the basis of the signals sS of a sensor system S and of the driver inputs fv predefined by the driver by means of a manual input unit mEE (e.g. target speed and/or distance range to be maintained from a vehicle traveling ahead), it outputs an acceleration signal a to a corresponding actuator system Ak. The actuator system Ak comprises a drive unit A and a brake unit B, for implementing the acceleration request. The sensor system S is configured here in such a way that the traffic event lying ahead can be detected by way of a radar system and/or a camera system, and therefore vehicles ahead which are relevant, in particular, for the speed control can be identified. These relevant data sS are transmitted to the control unit SE for further processing, with a result that in the case of so-called unobstructed travel the control takes place in such a way that the target speed fv which is predefined by the driver is set, and in the case of so-called follow-on travel (relatively slow vehicle traveling ahead) the control is carried out in such a way that a distance which is to be maintained in accordance with the driver setting fv is ensured. Basically, the control can be carried out as far as the stationary state and from the stationary state.

Furthermore, the control unit SE receives a speed signal v so that a standstill state of the vehicle which is reached on the basis of the speed control can be detected. The control unit SE is also connected to a sensor system HOS which is arranged in the steering wheel L. In addition, the control unit SE can be connected to a passenger compartment camera system KS (illustrated by dashes here). These sensor systems transmit a signal sHOS and, if appropriate, a signal sKS to the control unit SE in order to transmit information as to whether the driver has his hands on the steering wheel and/or when the driver has his hands on the steering wheel (at a defined position).

Figure 2:
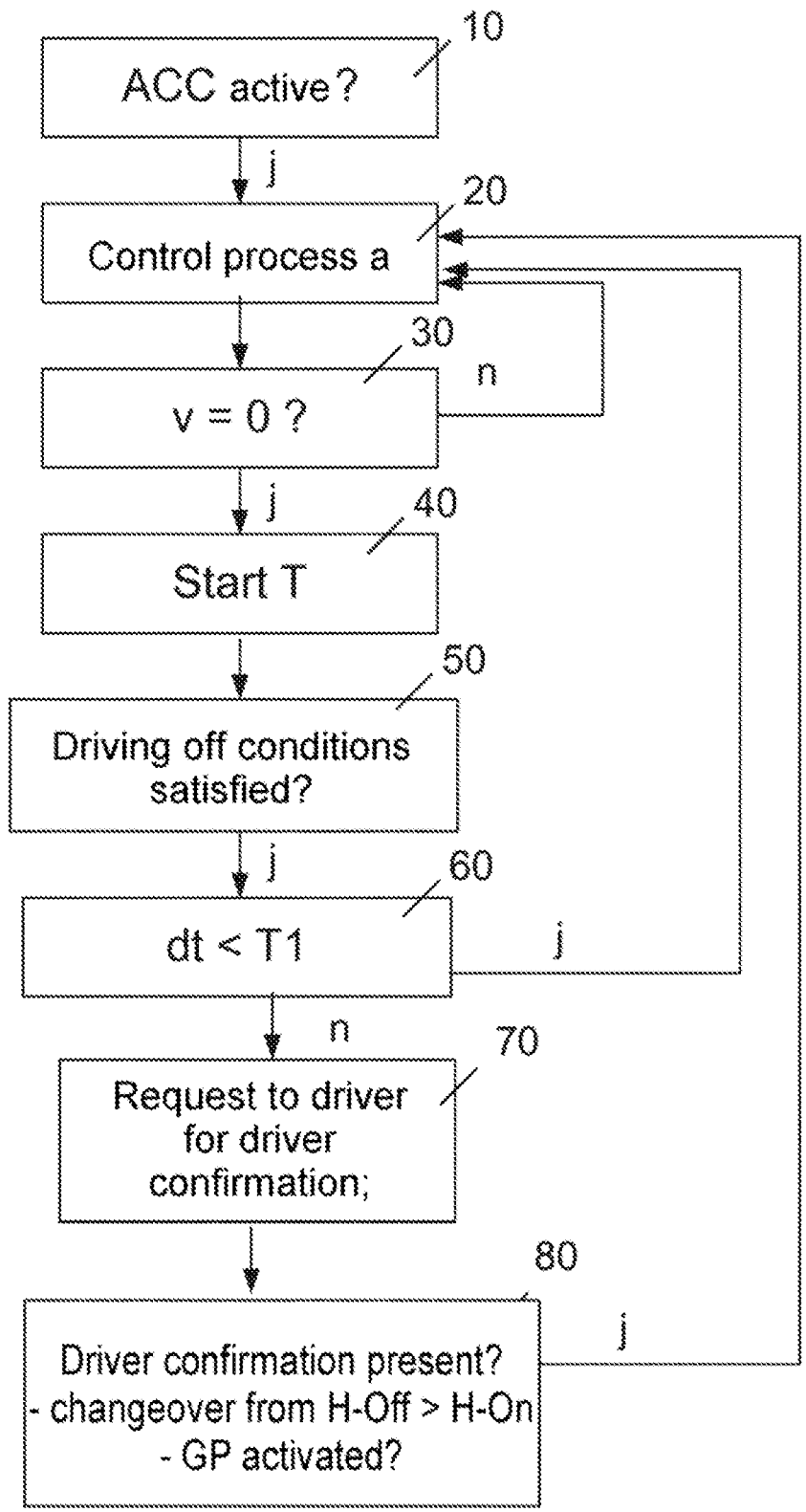
FIG. 2 is a flow chart of a possible refinement of the longitudinal control system for convenient automatic starting from a standstill state.

One possible refinement of the longitudinal control system for comfortable automatic starting out of the standstill state is now illustrated on the basis of the following description with respect to FIG. 2, wherein it is assumed that the relevant control unit is correspondingly designed to detect and process relevant input signals and output corresponding output signals to the actuator system for controlling the speed.

The flow chart starts in step 10 as soon as the distance-controlled speed control system ACC is switched on and active. As soon as the speed control system is activated, in step 20 the speed or acceleration control process "a" starts as a function of the target speed set by the driver, taking into account the traffic event lying ahead. The result is that in the case of unobstructed travel the target speed which has been set is maintained, and in the case of follow-on travel a necessary distance from the vehicle traveling ahead is maintained.

If the vehicle is itself controlled to a standstill state—for example owing to braking of the vehicle traveling ahead to the standstill state—so that the speed v of the vehicle is zero, a timer T is started when the standstill state (v=0 in step 30) is reached in the next step 40.

As soon as it is detected in the next step 50 that the vehicle could drive off again (in the near future) owing to the changed traffic situation ("driving off condition satisfied"), in the next step 60 it is interrogated whether the time dt which has passed since the starting of the timer T is (still) shorter than a predefined first time interval T1 within which automatic starting without a driving off confirmation is permitted. If this is the case, the system jumps back from step 60 to step 20, and automatic driving off, that is to say a corresponding speed control process, is brought about.

However, if it is determined in step 60 that the time dt which has passed since the starting of the timer T is not shorter than a predefined first time interval T1, in the next step 70 a message (visual and/or haptic and/or acoustic) requesting the vehicle to permit the automatic starting is output. The system then progresses to step 80.

The system stays in step 80 until a starting confirmation from the driver is registered. Depending on the configuration of the system, various possible ways for outputting a starting confirmation can be provided. According to the invention, e.g. a starting confirmation is registered if a contacted state H-On of the steering wheel is detected starting from a non-contacted state H-Off of the steering wheel. In this example, a contacted state H-On is detected if the driver grasps the steering wheel rim with both hands. Alternatively, a starting confirmation is also registered if (slight) activation of the accelerator pedal is detected.

As soon as a corresponding starting confirmation is detected, the system jumps back from step 80 to step 20 and automatic driving off, that is to say a corresponding speed control process, is brought about.

Many advantages can be achieved by means of the longitudinal control system according to the invention as proposed here. For example, the inventive configuration of the starting confirmation has a positive effect on the traffic flow, since a driver who has firstly taken his hands off the steering wheel in the standstill state will initially return his hands to the steering wheel before he triggers another action to confirm automatic starting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of using a longitudinal control system for a motor vehicle having a sensor system that detects a traffic event lying ahead and having a control unit that automatically controls a speed or acceleration of the motor vehicle to a standstill state and out of the standstill state based on the traffic event lying ahead, the method comprising the acts of:
   determining using the control unit, during a state of automatic longitudinal control of the vehicle and when the vehicle is in the standstill state, whether a predetermined time interval from a time when the standstill state began has been exceeded;
   if the predetermined time interval has been exceeded, detecting using the control unit whether a steering wheel of the vehicle is in a contacted state in which a driver has made contact with the steering wheel or a non-contacted state in which the driver is not in contact with the steering wheel;
   if the control unit detects that the steering wheel is in the non-contacted state, inhibiting using the control unit an automatic driving off action;
   if the control unit detects that the steering wheel is in the non-contacted state when the predetermined time interval is exceeded, determining using the control unit that a driver-triggered starting confirmation has been provided when the control unit detects the steering wheel is in the contacted state; and
   initiating the automatic drive off action when the control unit determines the driver-triggered starting confirmation has been provided.

2. The method as claimed in claim 1, wherein the starting confirmation is triggered if a contacted state of the steering wheel is detected in a defined activation mode starting from the non-contacted state of the steering wheel.

3. The method as claimed in claim 2, wherein the defined activation mode is a defined contact position and/or a defined contact sequence with respect to the steering wheel.

4. The method as claimed in claim 1, wherein the contacted state is detected if the driver touches the steering wheel in a defined contact region with at least one hand.

5. The method as claimed in claim 1, wherein the contacted state is detected when the driver applies a predefined contact pressure when touching the steering wheel with at least one hand.

6. The method as claimed in claim 1, wherein the contacted state is detected when the driver performs a predefined contact sequence at the steering wheel with at least one hand.

7. The method as claimed in claim 6, wherein the predefined contact sequence is performed in combination with defined contact positions with respect to the steering wheel.

8. The method as claimed in claim 1, wherein a contacted state is detected when the driver lets go of the steering wheel within a time interval which starts when the steering wheel is first touched, and the driver then touches the steering wheel again at least one more time.

9. The method as claimed in claim 1, wherein a contacted state is detected with a sensor system which is arranged in the steering wheel and/or with a camera system which captures at least a region of the steering wheel.

10. The method as claimed in claim 9, wherein the sensor system which is arranged in the steering wheel is a sensor system which measures capacitance in the steering wheel.

11. The method as claimed in claim 4, wherein the contacted state is detected if the driver touches the steering wheel in the defined contact region with both hands.

12. The method as claimed in claim 5, wherein the contacted state is detected when the driver applies the predefined contact pressure when touching the steering wheel with both hands.

13. The method as claimed in claim 1, wherein the traffic event lying ahead is a location of a vehicle traveling ahead.

\* \* \* \* \*